United States Patent
Chen et al.

(10) Patent No.: US 9,594,419 B2
(45) Date of Patent: Mar. 14, 2017

(54) METHOD AND DEVICE FOR PROLONGING SLEEPING TIME OF CPU

(71) Applicant: Sony Corporation, Tokyo (JP)

(72) Inventors: Hu Chen, Beijing (CN); Junjie Cai, Beijing (CN); Hao Zhao, Beijing (CN); Jing Xu, Beijing (CN)

(73) Assignee: SONY CORPORATION, Tokyo (JP)

( * ) Notice: Subject to any disclaimer, the term of this patent is extended or adjusted under 35 U.S.C. 154(b) by 290 days.

(21) Appl. No.: 14/245,214

(22) Filed: Apr. 4, 2014

(65) Prior Publication Data

US 2014/0304538 A1    Oct. 9, 2014

(30) Foreign Application Priority Data

Apr. 7, 2013    (CN) .......................... 2013 1 0118000

(51) Int. Cl.
*G06F 13/00*    (2006.01)
*G06F 1/32*    (2006.01)
*G06F 13/24*    (2006.01)

(52) U.S. Cl.
CPC ............ *G06F 1/3234* (2013.01); *G06F 13/24* (2013.01); *Y02B 60/32* (2013.01)

(58) Field of Classification Search
CPC ....................................................... G06F 13/24
See application file for complete search history.

(56) References Cited

U.S. PATENT DOCUMENTS

2011/0213906 A1\*  9/2011  Gustafsson ............ G06F 13/24
                                                          710/262

\* cited by examiner

*Primary Examiner* — Zachary K Huson
(74) *Attorney, Agent, or Firm* — Oblon, McClelland, Maier & Neustadt, L.L.P.

(57) ABSTRACT

This application discloses a method for prolonging sleeping time of CPU. After CPU enters sleeping state, interrupt controller delays reporting deferrable external interrupts to the CPU, with the delay time set or as default. This application also provides a device corresponding to the method. This application can prolong the sleeping time of CPU in all kinds of intelligent electronic devices, and make the CPU enter a deep sleeping mode, thereby reducing power consumption substantially without affecting system performance.

10 Claims, 7 Drawing Sheets

METHOD AND DEVICE FOR PROLONGING SLEEPING TIME OF CPU

FIELD OF THE INVENTION

This application relates to a method and a device for prolonging the sleeping time of CPU in such an intelligent electronic device as a computer, a tablet PC and a cell phone.

BACKGROUND OF THE INVENTION

CPU in an intelligent electronic device is either in a working state or in a sleeping state. The sleeping state of CPU is usually classified as one of a variety of sleeping modes from light to deep, the deeper the sleeping mode is, the lower the power consumption is, and meanwhile the higher the price for awaking (awaking time, power consumption required for awaking). When detecting that there is nothing to do at present and preparing to put the CPU into a sleeping state, operating system will weigh a variety of factors, and put the CPU into an appropriate sleeping mode.

The sleeping modes of various models of CPU, although differing in amount and meaning, have substantially the same principle. OMAP4460 chip of Texas instruments (TI) company, for example, is a dual-core CPU having the kernel of ARM Cortex A9, and has four sleeping modes C1-C4. The operating system determines which sleeping mode the CPU may enter according to expected sleeping time, as shown in the following Table 1:

TABLE 1

Four sleeping modes of OMAP4460 chip

| Expected sleeping time | Sleeping mode | From shallow to deep |
|---|---|---|
| >4 μs | C1 | lightest |
| >1100 μs | C2 | |
| >1200 μs | C3 | |
| >1500 μs | C4 | deepest |

OMAP4460 chip is just used as the CPU of the Google Galaxy Nexus cell phone, whose overall power consumption in addition to the display is listed as follows: 1 W in the working state; 0.62 W in the C1 sleeping mode; 0.15 W in the C2 sleeping mode; 0.12 W in the C3 sleeping mode; and 0.08 W in the C4 sleeping mode. Obviously, if the duration of CPU in the sleeping state can be prolonged while the system performance is guaranteed, or the sleep mode of CPU is changed from light to deep, the power consumption shall be reduced significantly.

In an intelligent electronic device with a single processor, the following three events may awake the CPU from the sleeping state to the working state:
1) CPU detects an external interrupt;
2) CPU detects an asynchronous abort event of an external device; and
3) CPU detects a debugging event, e.g. debugging of JTAG (Joint Test Action Group) or ICE (In-Circuit Emulator).

The interrupts are usually divided by the operating system into two major types, hardware interrupt and software interrupt, wherein the hardware interrupt is further divided into two minor types, external interrupt and internal interrupt. The external interrupt refers to an interrupt request from an external device (i.e. a hardware device in addition to the CPU and the memory). The interrupt controller is responsible for reporting the external interrupt to the CPU, with a programmable interrupt controller (PIC) currently widely used. An early interrupt controller is a hardware chip independently packaged separated from the CPU, while at present it is usually integrated with the CPU in one package.

An existing interrupt controller is as shown in FIG. 1. On one hand, it is connected to a plurality of external devices and receives the external interrupt from them; on the other hand, it is connected to the CPU and reports the external interrupts to the CPU, i.e. sending an interrupt signal to the CPU. Generally, the interrupt controller reports the external interrupt to the CPU immediately after receiving it. If a plurality of external interrupts occur simultaneously, the interrupt controller will report them one by one to the CPU according to the priority level. The CPU, once receiving the external interrupt, will call the corresponding interrupt processing function to process.

As shown in FIG. 2, the external interrupt is random in time, and the real-time reporting mechanism used in the interrupt controller is not based on whether the CPU is in working state or in sleeping state. The CPU in sleeping state, once receiving the interrupt signal, will be awaked into working state. Various external interrupts fragmentize the sleeping time of CPU, and make the CPU difficult to enter a deep sleeping mode.

A symmetric multi processor (SMP) system refers to that more than two processors are provided on one intelligent electronic device, and share resources such as memory and etc. The case in which a plurality of computing cores are gathered on one processor chip also belongs to the case of the SMP system, with each of the computing cores being regarded as a CPU. In the SMP system, in addition to the above three events, the CPU in the sleeping state will also be awaked back to the working state once it detects the memory consistency broadcast messages from other CPUs.

In the SMP system, each of the CPUs has an independent cache. A CPU, when modifying its own cache, will send memory coherency broadcast messages to other CPUs, telling other CPUs about this modification. Because the CPU makes very frequent modification to the cache, there are also frequent memory coherency broadcast messages.

As shown in FIG. 3, the memory coherency broadcast messages frequently occurring in the SMP system repeatedly awake a CPU in the sleeping state, with the CPU receiving the memory consistency broadcast messages even at the beginning of each sleep, and thus the CPU is awaked immediately; the awaked CPU will again enter the sleeping state in its spare time. This makes the sleeping time of each of the CPUs in the SMP system always very short, usually <10 μs.

SUMMARY OF THE INVENTION

The technical problem to be solved by this application is to provide a method for prolonging the sleeping time of CPU by designing the mechanism of delaying report of the interrupt controller, and/or stopping receiving the memory coherency broadcast messages when the CPU is sleeping, so as to awake the CPU in the sleeping state as seldom as possible and prolong the sleeping time of CPU. Therefore, this application further provides a device corresponding to the method for prolonging the sleeping time of CPU.

In order to resolve the above technical problem, the method for prolonging the sleeping time of CPU of this application includes the following steps:

Step 1: the CPU enters a sleeping state, and at the same time the interrupt controller distinguishes the type of the received external interrupt;

if the received external interrupt is deferrable, the interrupt controller will start the delay time that has been set, and proceed to Step 2 when the delay time finishes; and if the received external interrupt is of other types, the interrupt controller will proceed directly to Step 2;

Step 2: when the delay time of any deferrable external interrupt finishes, or when the interrupt controller receives an external interrupt of other types, the interrupt controller reports it immediately to the CPU, and then the CPU exits from the sleeping state;

Step 3: the CPU traverses the interrupt controllers to process all the external interrupts that have occurred, with the deferrable external interrupts processed even when the delay time has not arrived; and Step 4: the CPU enters a working state.

The device corresponding to the above method comprises the following parts:

a classification module, used for classifying all the external interrupts into the following three types: non-deferrable, deferrable, and continuous; the type of each of the external interrupts and the maximum deferrable time of the deferrable external interrupt are saved; and an interrupt controller, used for immediately reporting the external interrupt to the CPU when the CPU is in working state, delaying reporting the deferrable external interrupt to the CPU when the CPU is in the sleeping state, and immediately reporting an external interrupt of other types to the CPU when the CPU is in sleeping state;

the delay time of all the deferrable external interrupts is saved in the interrupt controller.

Another method for prolonging the sleeping time of CPU of this application includes the following steps:

Step 1: a CPU, prior to entering sleeping state, stops receiving memory coherency broadcast messages from other CPUs;

Step 2: the CPU enters sleeping state, and here the interrupt controller distinguishes the type of the received external interrupt;

if the received external interrupt is deferrable, the interrupt controller will start the delay time that has been set, and proceed to Step 3 when the delay time finishes; and if the received external interrupt is of other types, the interrupt controller will proceed directly to Step 3;

Step 3: when the delay time of the deferrable external interrupt finishes, or when the interrupt controller receives an external interrupt of other types, the interrupt controller reports it immediately to the CPU, and then the CPU exits from the sleeping state;

Step 4: the CPU, after exiting from the sleeping state and prior to entering working state, resumes receiving the memory consistency broadcast messages from other CPUs;

Step 5: the CPU traverses the interrupt controller to process all the external interrupts that have occurred, with the deferrable external interrupt processed even when the delay time does not finish; and Step 6: the CPU enters working state.

The device corresponding to the above method comprises the following parts:

a classification module, used for classifying all the external interrupts into the following three types: non-deferrable, deferrable, and continuous; the type of each of the external interrupts and the maximum deferrable time of the deferrable external interrupt are saved;

an interrupt controller, used for immediately reporting the external interrupt to the CPU when the CPU is in working state, delaying reporting the deferrable external interrupt to the CPU when the CPU is in sleeping state, and immediately reporting an external interrupt of other types to the CPU when the CPU is in sleeping state; the delay time of all the deferrable external interrupts is saved in the interrupt controller;

a module, used for making a CPU stop receiving the memory consistency broadcast messages from other CPUs before the CPU enters the sleeping state; and a module, used for making a CPU resume receiving the memory consistency broadcast messages from other CPUs after the CPU exits from the sleeping state and before the CPU returns to the working state.

For an intelligent electronic device with a single processor or multiple processors (particularly for an intelligent electronic device provided with the SMP system), this application can prolong the sleeping time of CPU and make the CPU enter a deeper sleeping mode, substantially without affecting the system performance while reducing the energy consumption.

DETAILED DESCRIPTION OF THE INVENTION

Figure 1:
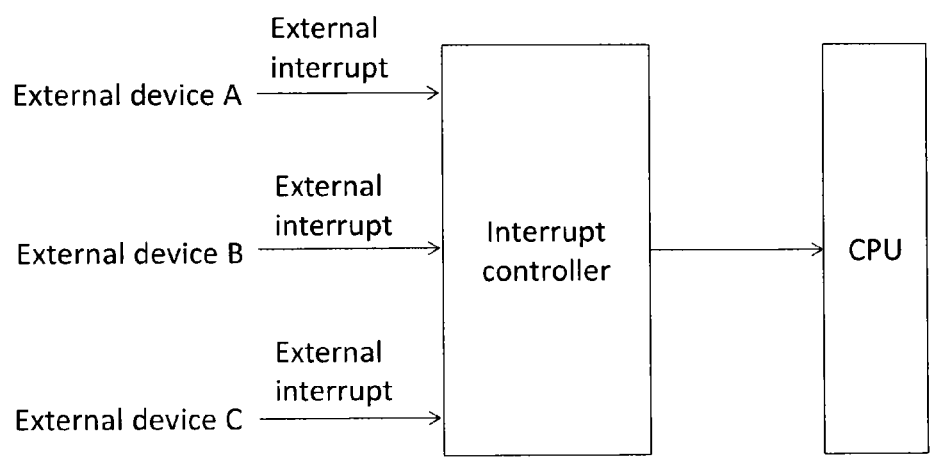
FIG. 1 is a schematic structural diagram of the existing interrupt controller.
Figure 2:
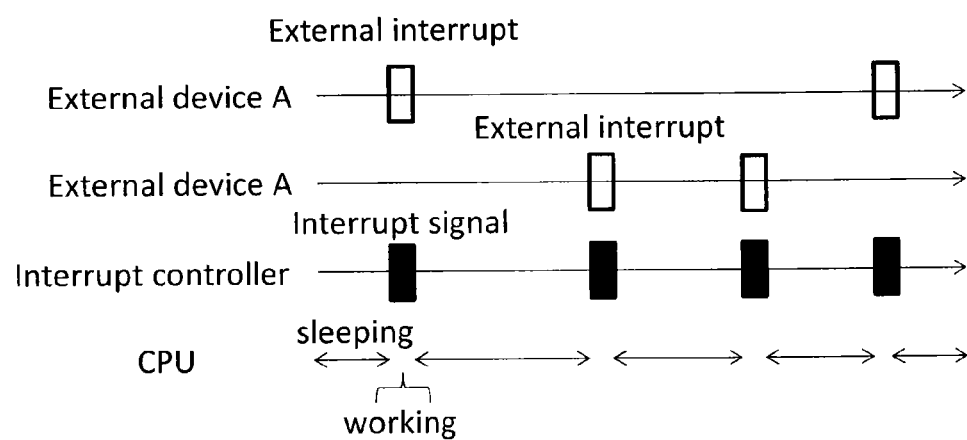
FIG. 2 is a schematic diagram of fragmentizing the sleeping time of CPU by the external interrupt.
Figure 3:
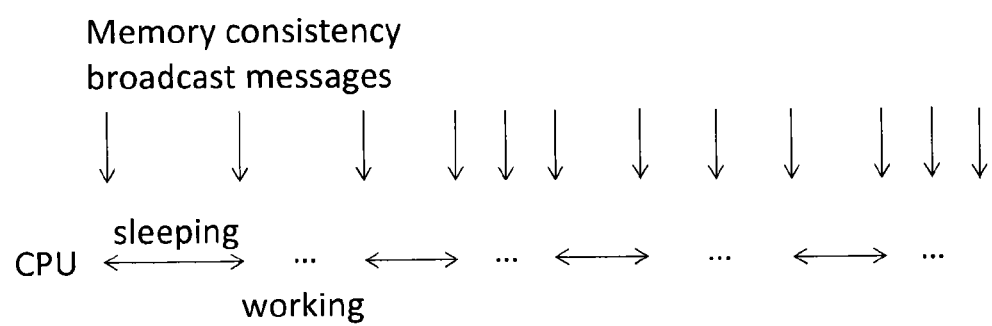
FIG. 3 is a schematic diagram of fragmentizing the sleeping time of CPU by the memory coherency broadcast messages.
Figure 4:
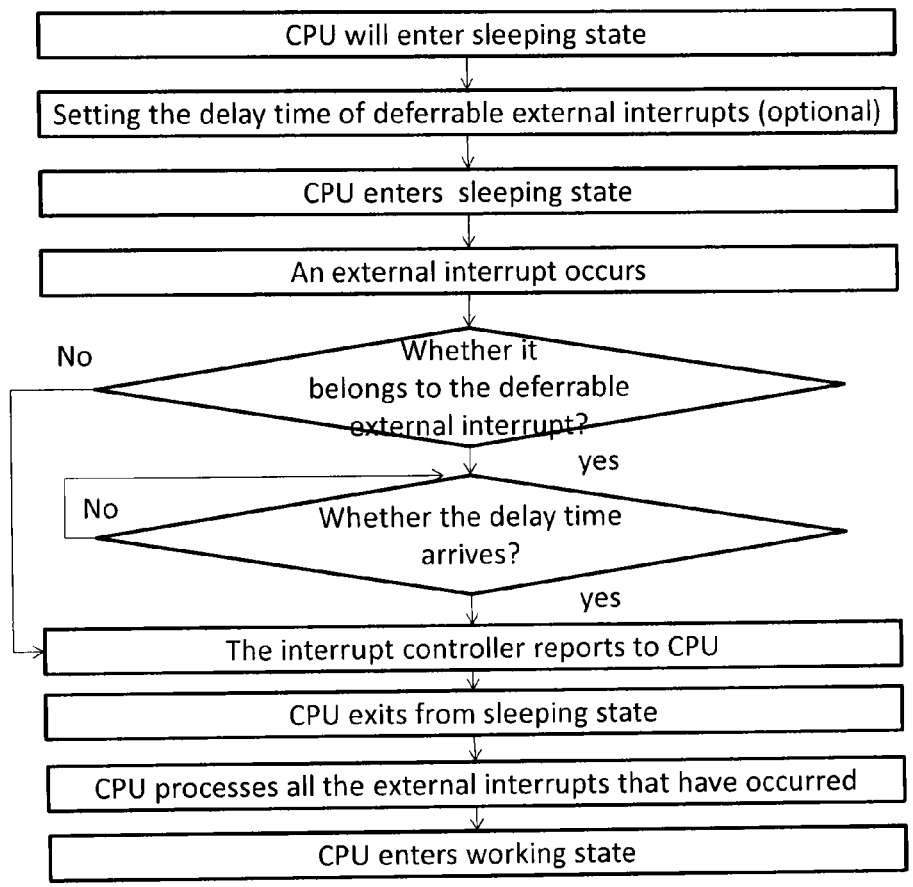
FIG. 4 is a schematic flow chart of a method for prolonging the sleeping time of CPU according to an embodiment of the invention.

The first embodiment of the method for prolonging the sleeping time of CPU of this application is as shown in FIG. 4, comprising the following steps:

Step 4.1: The CPU enters sleeping state. If there is an external interrupt here, the interrupt controller will first distinguish its type. If the received external interrupt is deferrable, the interrupt controller will start delay time that has been set, and proceed to Step 4.2 when the delay time finishes. If the received external interrupt is of other types, the interrupt controller will proceed directly to Step 4.2.

Step 4.2: When the delay time of any deferrable external interrupt finishes, or when the interrupt controller receives an external interrupt of other types, the interrupt controller reports it immediately to the CPU, and then the CPU exits from sleeping state.

Step 4.3: The CPU traverses the interrupt controller, and deals one by one with all the external interrupts that have occurred according to the priority level or the time sequence in which the deferrable external interrupt occurs, with the deferrable external interrupt processed even when the delay time is not arrived, which is called merger processing of the external interrupts.

Step 4.4: The CPU enters working state.

Optionally, prior to Step 4.1, i.e. before the CPU enters sleeping state, the delay time of each of the deferrable external interrupts can be set in the interrupt controller. For example, a maximum deferrable time is set for the deferrable external interrupt, or an expected sleeping time of this sleep of the CPU is set. If the delay time of each of the deferrable external interrupts has been set as default in the interrupt controller, e.g. it has always been set to be the maximum deferrable time respectively, this step shall be omitted.

Optionally, in Step 4.1 of the method, when the CPU enters sleeping state and the interrupt controller receives the deferrable external interrupt, the interrupt controller will first set the delay state of this external interrupt as being delayed, and then start the delay time that has been set; when the delay time finishes, the interrupt controller will first set the delay state of this external interrupt as undelayed, and then proceed to Step 4.2.

In Step 4.1 of the method, there involved is the distinguishment of the type of the external interrupt. This application classifies all the external interrupts into the following three types: non-deferrable, deferrable, and continuous. For example, a method of exhaustion can be adopted to classify all the external interrupts, and the maximum deferrable time of the deferrable external interrupt is obtained by a plurality of tests. This will be described in detail as follows:

A delay test is performed at a plurality of test times for each of the external interrupts, with the test time preferably selected in the range of 1-500 ms.

If each delay of this external interrupt causes the operating system to crash, this external interrupt will be classified as non-deferrable, typical of which are some external interrupts related to GPU (graphics processing unit).

If at least one delay of this external interrupt does not cause the operating system to crash, and the functions related to this external interrupt can be achieved, this external interrupt will be classified as deferrable. The maximum value meeting the above criteria at the selected plurality of test times can be taken as the maximum deferrable time of this deferrable external interrupt.

Some DMAs (Direct Memory Access) interrupts are typical of the deferrable external interrupt. For example, in some operating systems, the background music function is achieved via DMA. If the DMA interrupt is delayed, the operating system will not crash, but the background music will suffer distortion and/or noise. The degree of distortion is related to the delay time, with a minor delay within 10 ms making people feel almost no distortion. Again, for example, if some external interrupts for achieving the touch screen function are delayed, the operating system shall still respond to the touch operation, but the response speed will become slower. It is considered in these examples that the related function can be achieved.

If at least one delay of this external interrupt does not cause the operating system to crash, but the function related to this external interrupt cannot be achieved at the same time, this external interrupt will be classified as continuous.

Some external interrupts related to I2C (Inter-Integrated Circuit) are typical of the continuous external interrupt. For example, after some interrupts related to I2C are delayed, the operating system will not crash, but the related function is not achieved, either. This is because several continuous external interrupts are needed for completing a task. After the continuous external interrupt occurs for the first time and is processed, a second continuous external interrupt will occur again in a very short period of time, and is then processed again; again a third continuous external interrupt will occur and be processed; this process is repeated until the task is completed.

Through the experimental results that take the Google Galaxy Nexus cell phone and the HTC Desire cell phone as the hardware platform and are based on the Linux operating system, it is indicated that most of the external interrupts are deferrable, with a delay time less than 100 ms almost not affecting the system performance.

Taking the Google Galaxy Nexus cell phone as an example, the amount of its external interrupt is less than about 200, with a very short period of time needed for completing the above classification and testing the maximum deferrable time of these external interrupts by the method of exhaustion.

The method of the first embodiment of this invention is applicable to any intelligent electronic devices with a single processor or multiple processors, and can prolong the sleeping time of CPU, thus advantageous in making the CPU enter a deeper sleeping mode, thereby achieving the purpose of reducing the power consumption.

Figure 5:
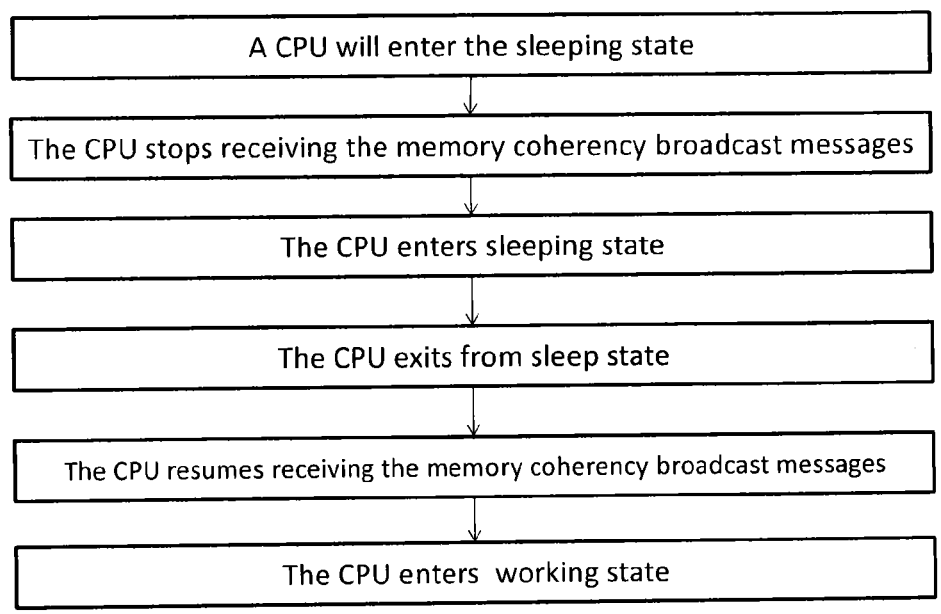
FIG. 5 is a schematic flow chart of a method for prolonging the sleeping time of CPU according to an embodiment of the invention.

FIG. 5 show the second embodiment of the method for prolonging the sleeping time of CPU of this application, which is applicable to an intelligent electronic device provided with the SMP system. The method comprises the following steps:

Step 5.1: A CPU, prior to entering sleeping state, stops receiving the memory coherency broadcast messages from other CPUs.

Step 5.2: The CPU enters sleeping state, and will not receive the memory coherency broadcast messages from other CPUs.

Step 5.3: The CPU, after exiting from sleeping state, resumes receiving the memory consistency broadcast messages from other CPUs.

Step 5.4: The CPU enters working state.

Optionally, in Step 5.1 of the method, a CPU also saves the contents of its own cache into a main memory (e.g. a RAM) prior to entering the sleeping state. This is because the contents of the cache of the CPU may be modified later than the corresponding contents in the main memory, and thus it is necessary to update the main memory according to the cache before the CPU enters sleeping state.

Taking the Google Galaxy Nexus cell phone running the Android 4.1 system as an example, under the condition that the user does not perform any operation on the cell phone, the sleeping time of CPU within 60 seconds is recorded by an original method and the method of the second embodiment, with the statistical results shown in the following Table 2.

TABLE 2

Comparison between the original method and the
method of the second embodiment of this invention
for making a CPU enter sleeping state

| Sleeping time | Original | method of the second embodiment |
|---|---|---|
| <1 μs | 600 times | 0 time |
| 1 μs~10 μs | 120 times | 0 time |
| 10 μs~100 μs | 50 times | 0 time |
| 100 μs~1 μs | 10 times | 5 times |
| 1 ms~10 ms | 50 times | 40 times |
| ... | ... | ... |

It can be seen that, by using the method of the second embodiment of this invention, a sleeping time fragment less than 100 μs of the CPU substantially disappears, and is replaced by a continuous sleeping time in a deeper sleeping mode, which greatly reduces the power consumption.

Figure 6:
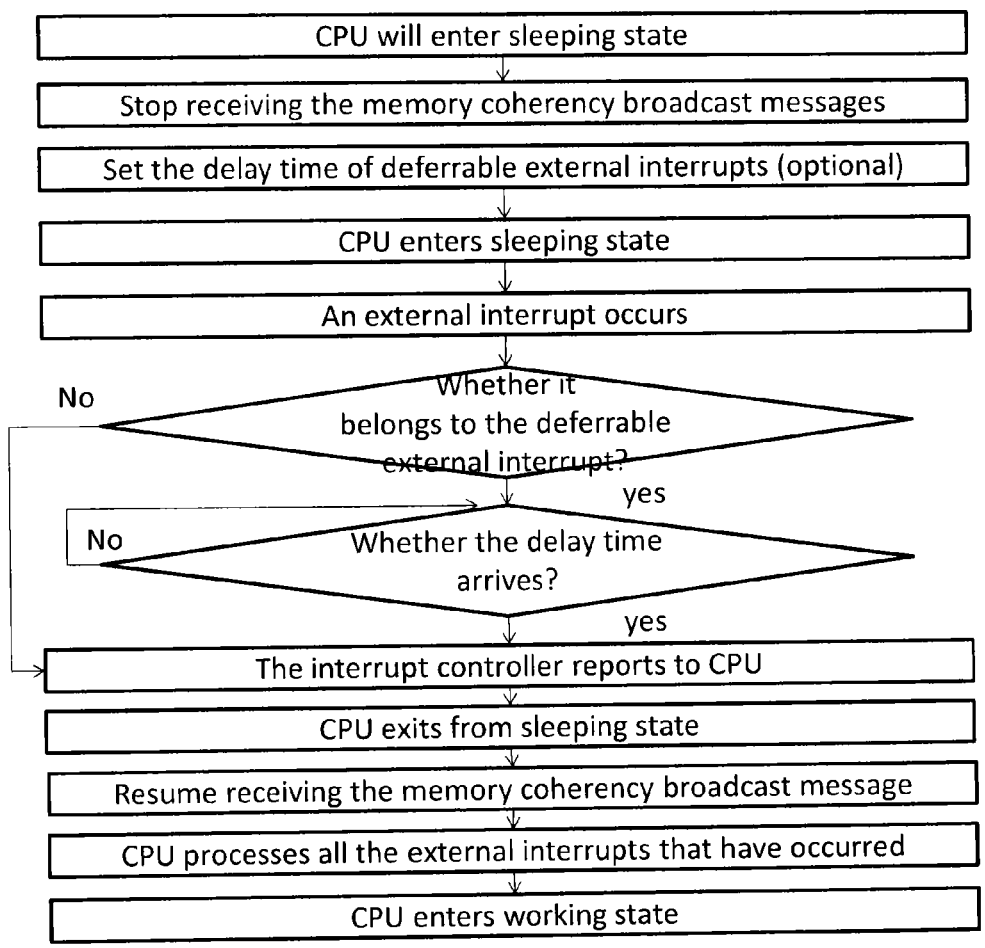
FIG. 6 is a schematic flow chart of a method for prolonging the sleeping time of CPU according to an embodiment of the invention.

FIG. 6 shows the third embodiment of the method for prolonging the sleeping time of CPU of this invention, which is applicable to an intelligent electronic device provided with the SMP system. The method comprises the following steps:

Step 6.1: A CPU, prior to entering sleeping state, stops receiving the memory coherency broadcast messages from other CPUs. This CPU also sets delay time of each of the deferrable external interrupts in the interrupt controller. If the delay time of each of the deferrable external interrupts has been set as default in the interrupt controller, this operation shall be omitted.

Step 6.2: The CPU enters sleeping state, and will not receive the memory coherency broadcast messages from other CPUs. If there is an external interrupt here, the interrupt controller will first distinguish its type. If the received external interrupt is deferrable, the interrupt controller will start the delay time that has been set, and proceed to Step 6.3 when the delay time finishes. If the received external interrupt is of other types, the interrupt controller will proceed directly to Step 6.3.

Step 6.3: When the delay time of any deferrable external interrupt finishes, or when the interrupt controller receives an external interrupt in addition to the deferrable external interrupt, the interrupt controller reports it immediately to this CPU, which then exits from sleeping state.

Step 6.4: This CPU resumes receiving the memory consistency broadcast messages from other CPUs.

Step 6.5: This CPU traverses the interrupt controller to process all the external interrupts that have occurred, regardless of whether its delay time arrives.

Step 6.6: The CPU enters the working state.

This third embodiment can be regarded as an integrated use of the first two embodiments. Still taking the OMAP4460 chip of the processor of the Google Galaxy Nexus cell phone as an example, a test was made during a period of 60 seconds on the game of Fruit Ninja run by this CPU based on the Android/Linux operating system in the QEMU (Quick EMUlator) simulation software, with the total sleeping time and the respective time in various sleeping states of the CPU recorded by the original method and the method of the third embodiment, respectively. The results are shown in the following Table 3.

TABLE 3

Comparison between the original method and the method of the third
example of this invention

| PIC | Total sleeping time (s) | C1 | C2 | C3 | C4 | Energy consumption (joule) |
|---|---|---|---|---|---|---|
| original | 35.72 | 22.82 | 1.7 | 4.1 | 7.1 | 39.74 |
| the method of the third embodiment | 38 | 1.3 | 0.3 | 0.7 | 35.7 | 25.79 |

It can be seen that the method of the third embodiment of this invention prolonged the sleeping time of CPU, with the ratio of the deep sleep (C4) significantly increased. According to the power consumption of the cell phone in addition to the display in various sleeping modes, it is estimated that the third embodiment of this invention can make the overall energy consumption of the cell phone reduced from 39.74 joules to 25.79 joules, saving energy by about 35.1%.

Figure 7:
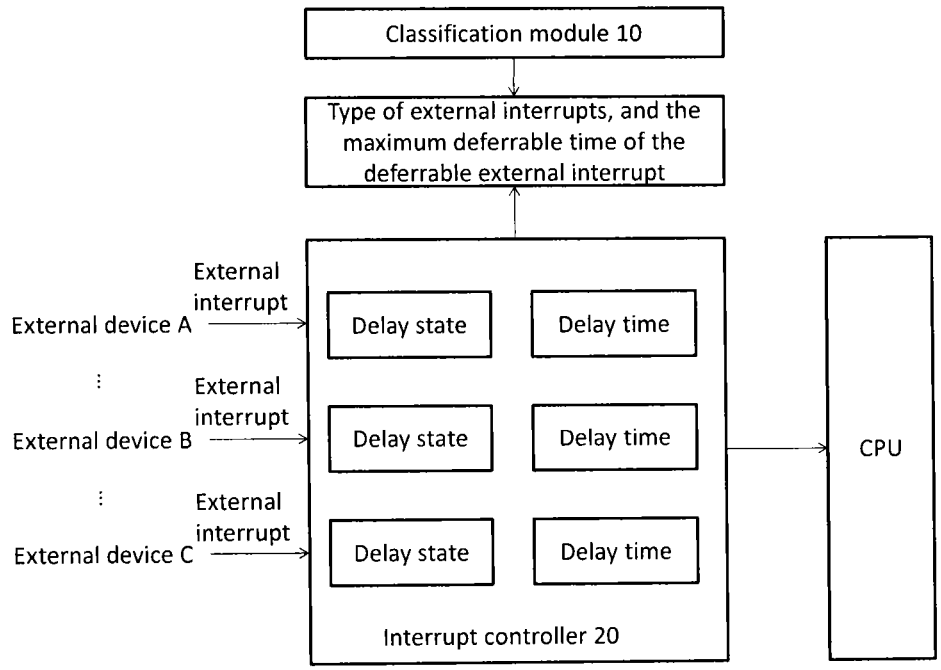
FIG. 7 is a schematic diagram of the device applicable to a single-processor system and the method according to the first embodiment of the invention.

The device suitable for prolonging the sleeping time of CPU of a single-processor system and corresponding to the method of the first embodiment is as shown in FIG. 7, comprising the following parts:

A classification module 10, used for classifying all the external interrupts into the following three types: non-deferrable, deferrable, and continuous; the type of each of the external interrupts and the maximum deferrable time of the deferrable external interrupt are saved, and can be saved in the inside or outside of the interrupt controller 20.

An interrupt controller 20, used for immediately reporting the external interrupt to the CPU when the CPU is in working state, delaying reporting the deferrable external interrupt to the CPU when the CPU is in sleeping state, and immediately reporting an external interrupt of other types to the CPU when the CPU is in sleeping state. The delay time of all the deferrable external interrupts is recorded in the interrupt controller 20. The delay time us not more than the maximum deferrable time of this deferrable external interrupt.

Optionally, the delay state of all the deferrable external interrupts is also recorded in the interrupt controller 20. The delay state is divided into two types: delayed, and undelayed.

Figure 8:
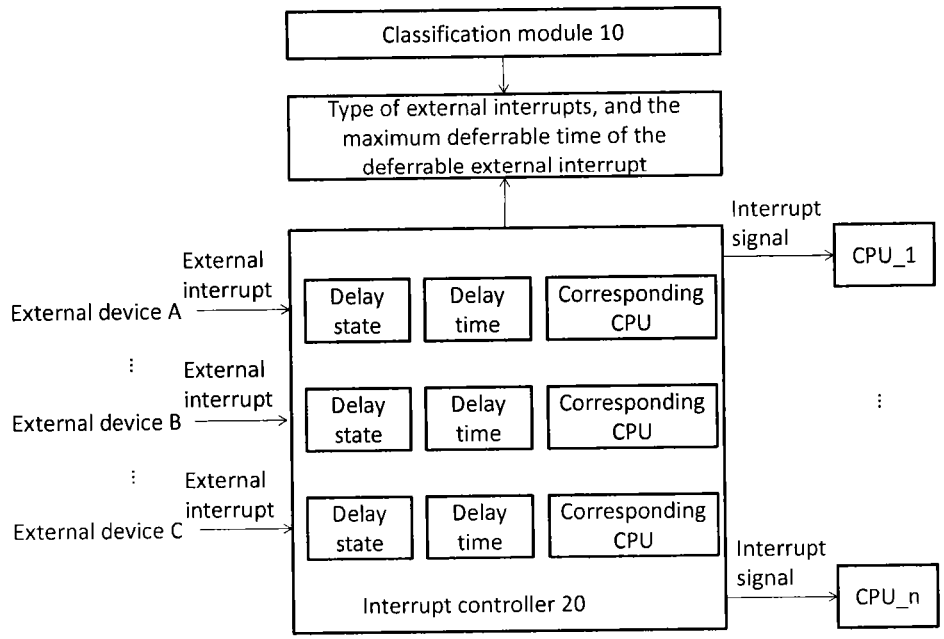
FIG. 8 is a schematic diagram of the device applicable to a SMP system and the method according to of the first embodiment of the invention.

The device suitable for prolonging the sleeping time of CPU in an SMP system and corresponding to the method of the first embodiment is as shown in FIG. 8. The device in FIG. 8 is distinguished from that in FIG. 7 in that the information that to which CPU processing the respective deferrable external interrupt corresponds is also recorded in the interrupt controller 20. In the SMP system, a plurality of CPUs share one interrupt controller. When some CPUs enter sleeping state, some other CPUs may still be in working state. The interrupt controller 20, once receiving an external interrupt, further needs to search to which CPU processing it corresponds in addition to searching its type, with the search sequence unlimited. For the deferrable external interrupt that is processed by a CPU in sleeping state, the mechanism of delay report of this application can then be used.

Figure 9:
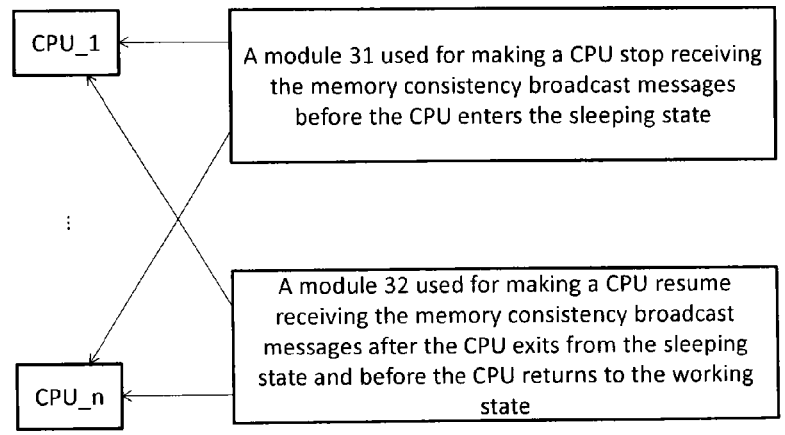
FIG. 9 is a schematic diagram of the device according to the method of the second embodiment of the invention.

The device suitable for prolonging the sleeping time of CPU of an SMP system and corresponding to the method of the second example is as shown in FIG. 9, comprising the following parts:

a module 31, used for making a CPU stop receiving the memory consistency broadcast messages from other CPUs before the CPU enters sleeping state; and a module 32, used for making a CPU resume receiving the memory consistency broadcast messages from other CPUs after the CPU exits from sleeping state and before the CPU returns to working state.

Figure 10:
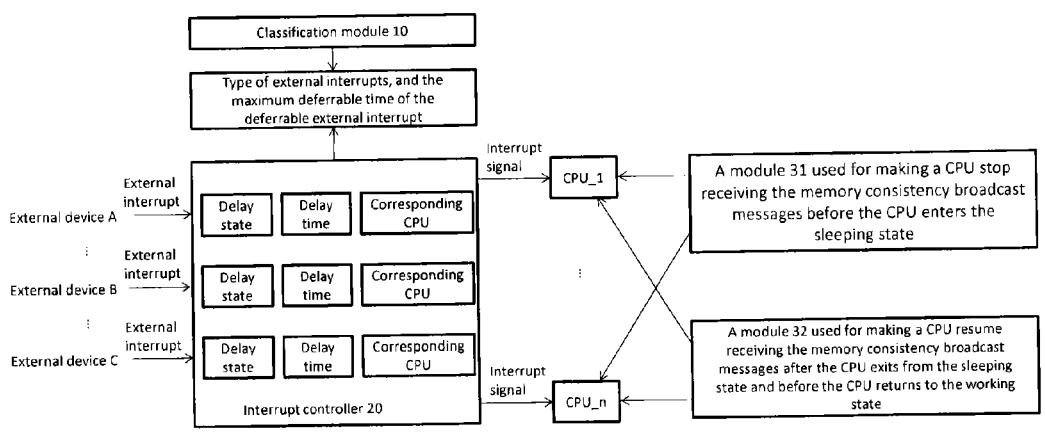
FIG. 10 is a schematic diagram of the device according to the method of the third embodiment of the invention.

The device suitable for prolonging the sleeping time of CPU of an SMP system and corresponding to the method of the third embodiment is as shown in FIG. 10, comprising the following parts:

a classification module, used for classifying all the external interrupts into the following three types: non-deferrable, deferrable, and continuous; the type of each of the external interrupts and the maximum deferrable time of the deferrable external interrupt are saved;

an interrupt controller, used for immediately reporting the external interrupt to the CPU when the CPU is in working state, delaying reporting the deferrable external interrupt to the CPU when the CPU is in sleeping state, and immediately reporting an external interrupt of other types to the CPU when the CPU is in sleeping state; the delay time of all the deferrable external interrupts is recorded in the interrupt controller 20;

a module 31, used for making a CPU stop receiving the memory consistency broadcast messages from other CPUs before the CPU enters sleeping state; and a module 32, used for making a CPU resume receiving the memory consistency broadcast messages from other CPUs after the CPU exits from sleeping state and before the CPU returns to working state.

The above is only the preferred embodiments of this application, instead of limiting this application. For those skilled in the art, this application can have a variety of alteration and change. Any amendment, equivalent replacement, improvement, etc. within the spirit and principle of this application shall fall within the extent of protection of this application.

What is claimed is:

1. A method for prolonging a sleeping time of a CPU, comprising:
when the CPU is in a sleeping state, determining, using circuitry, whether a received external interrupt is deferrable or of other types other than deferrable;
if the received external interrupt is deferrable, starting, using the circuitry, a delay time that has been set;
when the delay time of the deferrable external interrupt finishes, or if the external interrupt of is of one of the other types, reporting, using the circuitry, the external interrupt to the CPU immediately, and controlling the CPU, using the circuitry, to exit from the sleeping state;
controlling the CPU to process all external interrupts that have occurred, with deferrable ones of said all external interrupts processed even when the delay time does not finish; and
controlling the CPU to enter a working state.

2. The method for prolonging the sleeping time of CPU according to claim 1, further comprising, before the CPU enters the sleeping state, setting the delay time of each of the deferrable external interrupts or setting the delay time of each of the deferrable external interrupts to be a respective maximum deferrable time as a default.

3. The method for prolonging the sleeping time of CPU according to claim 1, further comprising classifying all the external interrupts into the following three types: non-deferrable, deferrable, and continuous; and setting a maximum deferrable time of the deferrable external interrupts by tests.

4. The method for prolonging the sleeping time of CPU according to claim 1, wherein, when the CPU enters the sleeping state and the received external interrupt is deferrable, the circuitry firstly sets the delay state of the received external interrupt as delayed and then starts the delay time that has been set; and when the delay time finishes, the circuitry sets the delay state of the received external interrupt as undelayed.

5. A method for prolonging a sleeping time of a CPU, comprising:
before the CPU enters a sleeping state, stopping the CPU, using circuitry, from receiving memory coherency broadcast messages from other CPUs;
when the CPU enters the sleeping state, distinguishing using the circuitry, whether a received external interrupt is deferrable or of other types other than deferrable;
if the received external interrupt is deferrable, starting, using the circuitry, a delay time that has been set;
when the delay time of the deferrable external interrupt finishes, or if the external interrupt is one of the other types, reporting, using the circuitry, the external interrupt immediately to the CPU, and controlling the CPU, using the circuitry, to exit from the sleeping state;
controlling the CPU, after exiting from sleeping state and prior to entering a working state, to resume receiving the memory consistency broadcast messages from the other CPUs;
controlling the CPU to process all external interrupts that have occurred, with deferrable ones of said all external interrupts processed even when the delay time does not finish; and
controlling the CPU to enter the working state.

6. The method for prolonging the sleeping time of CPU according to claim 5, wherein the CPU, prior to entering the sleeping state, saves the contents of its own cache into a main memory.

7. A device for prolonging a sleeping time of CPU, comprising:
circuitry configured to
classify all external interrupts into the following three types: non-deferrable, deferrable, and continuous; and saving the type of each of the external interrupts and a maximum deferrable time of the deferrable external interrupts;
immediately report the external interrupt to the CPU when the CPU is in a working state, delaying reporting the deferrable external interrupt to the CPU when the CPU is in a sleeping state, and immediately reporting an external interrupt of other types to the CPU when the CPU is in the sleeping state; and
saving the delay time of all the deferrable external interrupts.

8. The device of prolonging the sleeping time of CPU according to claim 7, wherein a delay state of all the deferrable external interrupts is saved; and the delay state is divided into two types: delayed, and undelayed.

9. The device for prolonging the sleeping time of CPU according to claim 7, wherein, the information of the CPU corresponding to the respective deferrable external interrupt is saved.

10. A device for prolonging a sleeping time of CPU, comprising:
  circuitry configured to
  classify all external interrupts into the following three types: non-deferrable, deferrable, and continuous; and save the type of each of the external interrupts and a maximum deferrable time of each of the deferrable external interrupts;
  immediately report the external interrupt to the CPU when the CPU is in a working state, delay reporting the deferrable external interrupt to the CPU when the CPU is in a sleeping state, and immediately report the external interrupt of other types to the CPU when the CPU is in the sleeping state; and save the delay time of all the deferrable external interrupts;
  control the CPU to stop receiving memory consistency broadcast messages from other CPUs before the CPU enters the sleeping state; and
  control the CPU to resume receiving the memory consistency broadcast messages from the other CPUs after the CPU exits from the sleeping state and before the CPU returns to the working state.

* * * * *